United States Patent

Salava

[15] 3,681,760

[45] Aug. 1, 1972

[54] BINARY SIGNAL UTILIZATION AND SELECTIVE ADDRESS DETECTION SYSTEM

[72] Inventor: Roger F. Salava, Arlington Heights, Ill.

[73] Assignee: Motorola, Inc., Franklin Park, Ill.

[22] Filed: Aug. 24, 1970

[21] Appl. No.: 66,428

[52] U.S. Cl. ..............................340/172.5, 101/93 C

[51] Int. Cl. ..............................................G11c 7/00

[58] Field of Search .......................340/172.5; 101/93

[56] References Cited

UNITED STATES PATENTS

| | | | |
|---|---|---|---|
| 2,905,930 | 9/1959 | Golden | 340/172.5 X |
| 2,918,658 | 12/1959 | Hoberg et al. | 101/93 X |
| 2,919,967 | 1/1960 | Schwartz | 101/93 X |
| 3,153,776 | 10/1964 | Schwartz | 340/172.5 |
| 3,193,802 | 7/1965 | Deerfield | 340/172.5 |
| 3,249,923 | 5/1966 | Simshauser | 340/172.5 |
| 3,336,587 | 8/1967 | Brown | 340/324 |

*Primary Examiner*—Paul J. Henon
*Assistant Examiner*—Paul R. Woods
*Attorney*—Vincent J. Rauner and Lester N. Arnold

[57] ABSTRACT

A binary signal utilization and selective address detection system for an electronic printer wherein a first storage register serially accepts and stores binary signals in a binary signal train, then simultaneously couples all binary signals in the first storage register to a transfer register. The transfer register is provided to allow binary address signals entered into both registers to be sampled by a detector for a desired binary address. If the desired binary address is recognized, the detector causes subsequent binary print signals to cause operation of electronic printer hammers. Such print signals are serially applied to the first storage register, and then simultaneously transferred to the transfer register which applies them to electronic printer hammers while the succeeding binary signals in the binary signal train are serially entered into the first storage register.

9 Claims, 4 Drawing Figures

INVENTOR
ROGER F. SALAVA
BY Vincent J. Rauner
ATTY.

INVENTOR
ROGER F. SALAVA
BY Vincent J. Rauner
ATTYS.

BINARY SIGNAL UTILIZATION AND SELECTIVE ADDRESS DETECTION SYSTEM

BACKGROUND OF THE INVENTION

Electronic printers, used for printing data transmitted from a remote point, received the desired information in the form of a serially received binary signal train. The binary signals are transmitted very rapidly in order to send a maximum amount of data in a given period of time. The signals are received by the printer at a rate which is much faster than the operating time of the electronic printer hammers. In order to operate a printer device to print the desired information as the binary signals are received, complex circuitry is required. It may also be desired to use a plurality of printers and to print certain information at a particular one of the printers. To accomplish this, the binary signals can include address signals preceding the print signals, to select particular printers. In order to provide selection of particular printers in response to an address signal, and operate a printer device to print the desired information as the binary signals are received, the complexity of the printer circuitry must be further increased. If a substantial number of printers are to be individually selected, the address signal becomes so long that a storage portion of the printer circuitry must be further increased in size and complexity.

SUMMARY OF THE INVENTION

It is, therefore, an object of this invention to provide an electronic printer capable of printing the desired information as the binary signals are received.

Another object of this invention is to provide an electronic printer including a decoder circuit for selective operation of the printer.

Still another object of this invention is to provide an electronic printer requiring a minimum of circuitry for the address decoder and printer storage circuitry.

Yet another object of this invention is to provide storage circuitry in the electronic printer, which cooperates in parallel relation for the electronic printer printing operation, and in serial relation for the decoding operation.

In practicing this invention, a binary signal utilization and selective address detection system is provided wherein a train of binary signals, including an address portion and a print portion, is received by an input circuit and serially coupled to, and stored in, a first storage register. A second storage register coupled to the first storage register is adapted to simultaneously receive all the binary signals from the first storage register and store the binary signals therein. A binary signal detector coupled to the first and second storage register is adapted to develop a detector signal in response to the binary address signal portion being entered into both registers. A control circuit, operative in response to the receipt of the predetermined number of binary signals in the binary address portion, enables the detector. If the desired binary address is recognized, the detector signal is coupled to the control circuit. The control circuit is operative thereafter to enable the second storage register to simultaneously receive all the binary print signals from the first storage register, and to enable the printer hammer drivers, coupled to the second storage register, to simultaneously receive all the binary print signals in the second storage register. The printer hammer drivers simultaneously operate the printer hammers while the succeeding binary signals in the binary signal train are serially entered into the first storage register.

DETAILED DESCRIPTION

Figure 1:
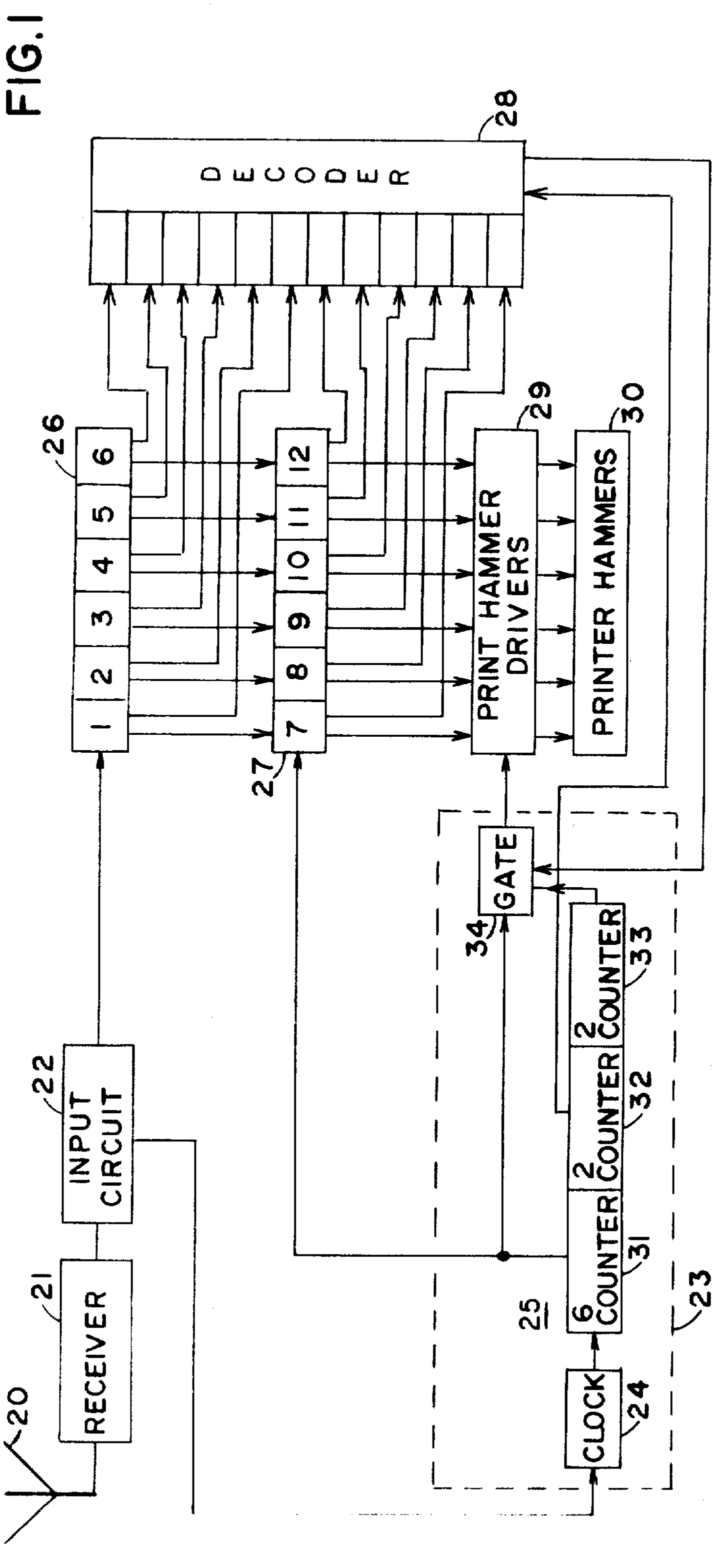
FIG. 1 is a block diagram of the binary signal utilization and selective address detection system of this invention.
Figure 2A:
FIG. 2 shows the waveform at certain points of the system shown in FIG. 1.
Figure 2B:

Referring to FIG. 1, a modulated radio frequency (RF) signal is received at antenna 20, and coupled to receiver 21, where it is converted in a manner well known in the art to a phase shift modulated signal such as shown in FIG. 2A. The phase shift modulated signal is coupled to input circuit 22 in the electronic printer where it is demodulated as shown in FIG. 2B, to form a train of square-wave shaped signals hereinafter called the train of binary signals. The train of binary signals sent to a particular embodiment of the electronic printer consists of three distinct parts. The first part consists of binary signals, or bits, which provide synchronization information that is used to synchronize the electronic printer with the timing of the incoming signals. The second part consists of 24 binary signals or bits which constitute a repeated 12 bit address. The purpose of the address part is to allow the selection of a particular electronic printer from a group of electronic printers and allow printing of the desired information. The 12 bit address is repeated to insure recognition by the desired electronic printer. The third part consists of 2,880 binary signals, or bits of data, which energize six electronic printer hammers to print a 36 character message line. Each printer hammer prints six characters. Each binary signal can cause a printer hammer to print one dot on the paper. Particular arrangements of the dots will form the desired characters. In the particular embodiment described herein, the six printer hammers operate simultaneously to print six dots in six characters.

The synchronization portion of the binary signal train is coupled from input circuit 22 to control circuit 23. Control circuit 23 includes a clock 24, which is synchronized by the incoming synchronization signal to operate at the bit rate of the binary signals. Clock 24 generates timing pulses at the bit rate which are coupled to cyclical counter 25. Counter 25 includes three counters, 31, 32 and 33. Counter 31 cyclically counts to six and develops a counting signal for each six count. Counter 32 is coupled to counter 31 and counts to two in response to the second 6 count from counter 31. Counter 32 therefore counts to 12. Counter 33 is coupled to counter 32 and counts to two in response to the second two count from counter 32. Counter 33 therefore counts to 24.

Although the synchronization portion of the binary signal train is coupled to the remaining portions of the circuitry herein described, its main function is to time the system for proper acceptance of the remaining portions of the binary signal train.

The address portion of the binary signal train is received by input circuit 22 and serially coupled to first storage register 26. First storage register 26 includes six stages 1 through 6. The binary signals in the binary signal train are serially entered into storage register 26. That is, the first received binary signal is entered into the first stage of storage register 26. The second received binary signal is then entered into the first stage of storage register 26, causing the first binary signal to be shifted to the second stage. This process continues until six binary signals have been entered into the six stages of first storage register 26, with the first received binary signal entered into the sixth stage, and the sixth received binary signal entered into the first stage. A six count counting signal, corresponding in time to the receipt by first storage register 26 of the sixth binary signal, is developed by counter 31 in control circuit 23 and coupled to a second storage, or transfer register 27. Storage register 27 is also a six stage storage register, having stages, 7 through 12, which is coupled in parallel with storage register 26. The six count counting signal will enable transfer register 27, causing it to simultaneously couple the six binary signals stored in first storage register 26 into the six stages of transfer register 27. The first received binary signal will now be entered into the sixth stage of transfer register 27, (stage 12), and the sixth received binary signal will be entered into the first stage of transfer register 27, (stage 7).

The seventh binary signal is now serially entered into the first stage of first storage register 26, as was the first binary signal; then the eighth binary signal and so on until the 12th binary signal is entered into the first stage of storage register 26 and the seventh binary signal is entered into the sixth stage of storage register 26. A six and a 12 count counting signal, corresponding in time to the receipt by first storage register 26 of the 12th binary signal, is developed by counters 31 and 32 respectively. The six count counting signal is coupled to transfer register 27. The twelve count counting signal is coupled to decoder 28.

Decoder 28 is a 12 stage decoder which may be adapted to recognize one or more combinations of twelve binary signals and develop a detection signal in response thereto.

Figure 3:
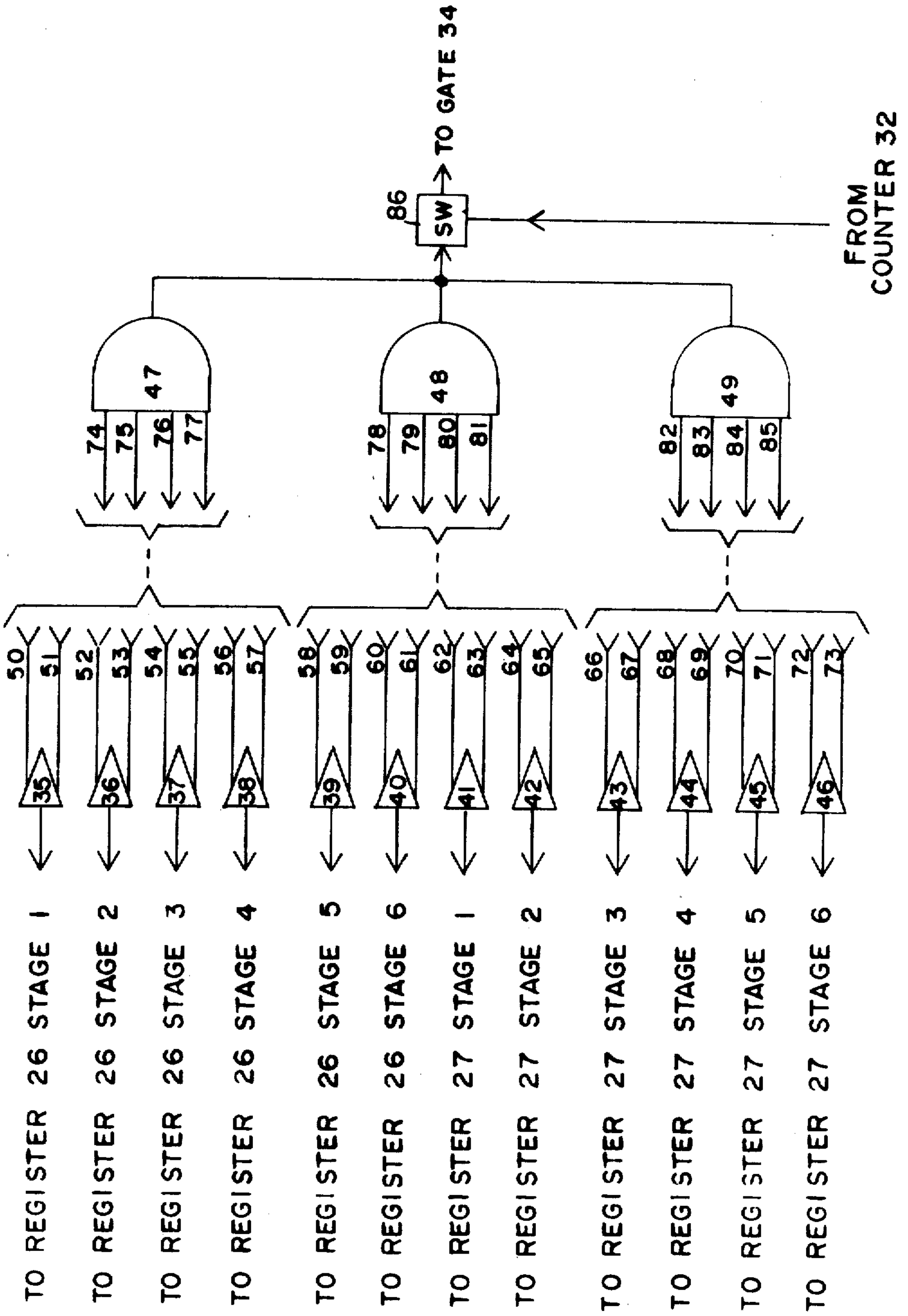
FIG. 3 is a block diagram of the decoder shown in FIG. 1.

Referring to FIG. 3, decoder 28 includes 12 inverters labeled as 35 through 46, having both inverted and noninverted outputs shown as 50 through 73. The even numbered outputs being the inverted outputs and the odd numbered outputs being the non-inverted outputs. The input to each inverter is coupled to one stage of first storage register 26 and second storage register 27, as shown. Three AND gates 47–49, each having four inputs 74–85, have each input selectively coupled to one of the outputs of one inverter, in accordance with the desired binary address. For example, if the desired binary address is 010101010101, the following table lists the connections.

| INVERTER | OUTPUT | AND GATE | INPUT |
|---|---|---|---|
| 35 | 50 | 43 | 74 |
| 36 | 53 | 43 | 75 |
| 37 | 54 | 43 | 76 |
| 38 | 57 | 43 | 77 |
| 39 | 58 | 44 | 78 |
| 40 | 61 | 44 | 79 |
| 41 | 62 | 44 | 80 |
| 42 | 65 | 44 | 81 |
| 43 | 66 | 45 | 82 |
| 44 | 69 | 45 | 83 |
| 45 | 70 | 45 | 84 |
| 46 | 73 | 45 | 85 |

As is commonly known in the art, AND gates 47–49 each will activate if a binary one (1) is coupled to each of their inputs. Referring to the above table, if the AND gates are connected to the inputs indicated, and the above address is received, binary ones (1's) will appear at each input, activating all AND gates.

The outputs of AND gates 47–49 are coupled to switch 86 which is enabled by the 12 count counting signal from counter 32.

If the correct address is detected in both first storage register 26 and storage register 27, AND gates 47–49 in decoder 28 will develop a detection signal which is coupled through switch 86 and may be used to allow further operation of the electronic printer. In the embodiment shown, the detection signal is coupled to gate 34 in control circuit 23 enabling gate 34 to allow each succeeding six count counting signal to also be coupled to printer hammer drivers 29. If an incorrect address is received, no printing will occur. The unit will continue to look for a correct address, but this can only occur in response to the second portion of a later transmitted message.

The above process will be repeated a second time for the repeated twelve kit address, to insure detection of the address by decoder 28. This second or 24 count indicating receipt of the repeated address is developed by counter 33. Decoder 28 may recognize the first or the repeated address and activate gate 34 in response to either address. Counter 33 in addition to counting the repeat address, inhibits gate 34 until the repeat address is completed, thereby allowing only the third portion of the binary signal train to be coupled to print hammer drivers 28.

After the address portion is received and detected by decoder 28, and the detection signal is coupled to control circuit 23, each succeeding six bit group of binary signals, in the third portion of the binary signal train will be serially coupled from input circuit 22 to storage register 26 as previously described. A six count counting signal, corresponding in time to the receipt by first storage register 26 of the sixth binary signal in each group, is developed by counter 31 in control circuit 23, and coupled to transfer register 27 and printer hammer drivers 29. The six count counting signals will enable storage register 27 and printer hammer drivers 29 as will be described, causing a simultaneous transfer of all the binary signals in first storage register 26 to transfer register 27, and the simultaneous transfer of all the binary signals in storage register 27 to printer hammer drivers 29.

The six count counting signals when coupled to printer hammer drivers 29 will enable the drivers, causing them to develop printer hammer driving signals in response to the binary signals in storage register 27. The printer hammer driving signals are coupled from printer hammer drivers 29 to printer hammers 30 energizing the hammers to print dots on the paper. Each printer hammer driver will however only develop the printer hammer driving signal if the stage of transfer register to which it is coupled contains a binary one.

As can be seen, a binary signal utilization and selective address protection system has been provided wherein a binary signal address for a particular electronic printer is received, the first six binary signals in the address are first serially entered into a first storage register then simultaneously transferred to a transfer register. When the second six binary signals have been serially entered into the first storage register, a decoder samples the contents of both registers. If the twelve binary signals contained in both registers corresponds with the binary address for that particular printer, the decoder will develop a detection signal which is coupled to the control circuit to allow printing of the succeeding binary signals. The following binary signals are serially coupled to the first storage register, and then simultaneously transferred to the second storage register to allow operation of the electronic printer hammers while the succeeding binary signals are entered into the first storage register.

By utilizing the first storage register and the transfer register in a parallel manner for printing, and in a serial manner for decoding the desired printer address, the operating speed of the electronic printer is substantially increased while providing an electronic printer with a selective decoder and a minimum of circuitry for the address decoder and printer storage.

I claim:

1. A binary signal utilization and selective address detection system for a train of binary signals wherein said system includes in combination; input means for receiving said train of binary signals; first storage means coupled to said input means for serially receiving and storing said binary signals, second storage means coupled to said first storage means, said second storage means being operative to simultaneously receive all said binary signals from said first storage means and store said binary signals therein, utilization means coupled to said second storage means, said utilization means being operative to simultaneously utilize all said binary signals in said second storage means, binary signal detection means coupled to said first and second storage means, said binary signal detection means being operative to develop a detection signal in response to particular combinations of binary signals in both said first and second storage means, and control means coupled to said detection means and utilization means and responsive to said detection signal to control the application of binary signals from said second storage means to said utilization means.

2. The binary signal utilization and selective address detection system of claim 1 wherein said control means has portions coupled to said input means, said second storage means, said utilization means, and said binary signal detection means, said control means being operative in response to the receipt of a first predetermined number of binary signals to enable said second storage means, said control means being operative in response to the receipt of a second predetermined number of binary signals to enable said binary signal detection means, said control means being further operative in response to the receipt of said first predetermined number of binary signals and said detection signal to enable said utilization means.

3. The binary signal utilization and selective address detection system of claim 2 wherein said first storage means includes a storage register having a plurality of stages.

4. The binary signal utilization and selective address detection system of claim 3 wherein said storage register includes six stages.

5. The binary signal utilization and selective address detection system of claim 3 wherein said second storage means includes a storage register having the same number of stages as said first storage means.

6. The binary signal utilization and selective address detection system of claim 5 wherein said utilization means includes a printer having printer hammer means and printer hammer driver means coupled to said second storage means and said control means, said printer hammer driver means being enabled by said control means to develop printer hammer driving signals in response to said binary signals in said second storage means, said printer hammer means being coupled to said printer hammer driver means for printing dot formed characters, said printer hammer means operative in response to said driving signals to print said dots.

7. The binary signal utilization and selective address detection system of claim 5 wherein said control means includes, clock means coupled to said input circuit means, said clock means developing timing pulses in accordance with said binary signals in said train of binary signals, and counter means coupled to said clock means, said second storage means, said utilization means, and said binary signal detection means, said counter means being operative in response to said timing pulses to cyclically count to a first particular number equal to said predetermined number of binary signals and develop a first counting signal for enabling said second storage means, said counter means being further operative in response to said first counting signals to count to a second particular number equal to said second predetermined number of binary signals and develop a second counting signal for enabling said binary signal detection means, said counter means being further operative to couple said first counting signals to said utilization means to enable said utilization means.

8. The binary signal utilization and selective address detection system of claim 7 wherein said counter means includes means operative to count to said second particular number twice.

9. The binary signal utilization and selective address detection system of claim 7 wherein said binary signal detection means includes, a plurality of inverter means each having an input coupled to said first and second storage means, and having first and second outputs, said inverter means being responsive to said binary signals coupled thereto from said first and second storage means to develop an inverted signal at said first output and a non-inverted signal at said second output, and AND gate means selectively coupled to particular ones of said first and second inverter outputs, said AND gate means responsive to particular combinations of inverted and non-inverted signals coupled thereto to develop said detection signal.

* * * * *